(12) United States Patent
Klum et al.

(10) Patent No.: US 9,066,447 B2
(45) Date of Patent: Jun. 23, 2015

(54) HEAT DISSIPATION FOR A CHIP PROTECTED BY AN ANTI-TAMPER BACKGROUND

(75) Inventors: R. Daren Klum, Shoreview, MN (US); Matthew D. Fairchild, Rosemount, MN (US); Daniel L. Hench, Orlando, FL (US); Keith A. Pagan, Orlando, FL (US); Robert Sean Hagen, Dunedin, FL (US)

(73) Assignee: Cram Worldwide, LLC, Shoreview, MN (US)

( * ) Notice: Subject to any disclaimer, the term of this patent is extended or adjusted under 35 U.S.C. 154(b) by 428 days.

(21) Appl. No.: 13/288,367

(22) Filed: Nov. 3, 2011

(65) Prior Publication Data

US 2012/0050998 A1    Mar. 1, 2012

(51) Int. Cl.
*H05K 7/20*     (2006.01)
*G06F 21/86*    (2013.01)
*H05K 5/02*     (2006.01)

(52) U.S. Cl.
CPC ....... *H05K 7/20445* (2013.01); *Y10T 29/49002* (2015.01); *G06F 21/86* (2013.01); *G06F 2221/2143* (2013.01); *H05K 5/0208* (2013.01)

(58) Field of Classification Search
USPC ............ 361/676, 679.54, 688–722, 752–760, 361/807, 831
See application file for complete search history.

(56) References Cited

U.S. PATENT DOCUMENTS

| | | | |
|---|---|---|---|
| 6,233,339 B1 * | 5/2001 | Kawano et al. | 380/44 |
| 6,421,013 B1 * | 7/2002 | Chung | 343/700 MS |
| 6,970,360 B2 * | 11/2005 | Sinha | 361/752 |
| 7,015,823 B1 * | 3/2006 | Gillen et al. | 340/652 |
| 7,180,008 B2 * | 2/2007 | Heitmann et al. | 174/261 |
| 2004/0155308 A1 * | 8/2004 | McFadden et al. | 257/422 |
| 2005/0036292 A1 * | 2/2005 | Chengalva et al. | 361/715 |
| 2009/0047797 A1 * | 2/2009 | Anderson et al. | 438/763 |
| 2011/0090658 A1 * | 4/2011 | Adams et al. | 361/765 |
| 2013/0050155 A1 * | 2/2013 | Petersen et al. | 345/204 |

* cited by examiner

*Primary Examiner* — Courtney Smith
(74) *Attorney, Agent, or Firm* — Fogg & Powers LLC

(57) ABSTRACT

Systems and apparatus disclosed herein provide for heat dissipation from a chip protected by an anti-tamper material. An example electronic device includes a circuit board having electronics mounted thereon, and a security shield covering one or more electronics on the circuit board and configured to sense tampering, the one or more electronics including a chip, the security shield defining an aperture. The device also includes a heat sink extending through the aperture and thermally coupling with the chip, the heat sink extending outside of the security shield.

20 Claims, 5 Drawing Sheets

HEAT DISSIPATION FOR A CHIP PROTECTED BY AN ANTI-TAMPER BACKGROUND

BACKGROUND

Physical device security is essential when a device holding secret data is to be placed in potentially unfriendly hands. To protect the secret data, the device can be configured to sense attempted physical access (e.g., tampering) to the device and can zeroize the data upon the attempted physical access. In order to easily zeroize the data, it can be stored on a memory device (e.g., a volatile random access memory (RAM)). Sensing the attempted physical access to the device can be accomplished with a tamper sensitive material disposed to detect attempted access to the memory device. When the tamper sensitive material senses an attempted access to the memory device, the memory device can be zeroized thereby rendering the secret data unobtainable.

SUMMARY

Systems and apparatus disclosed herein provide for heat dissipation from a chip protected by an anti-tamper material. An example electronic device includes a circuit board having electronics mounted thereon, and a security shield covering one or more electronics on the circuit board and configured to sense tampering, the one or more electronics including a chip, the security shield defining an aperture. The device also includes a heat sink extending through the aperture and thermally coupling with the chip, the heat sink extending outside of the security shield

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
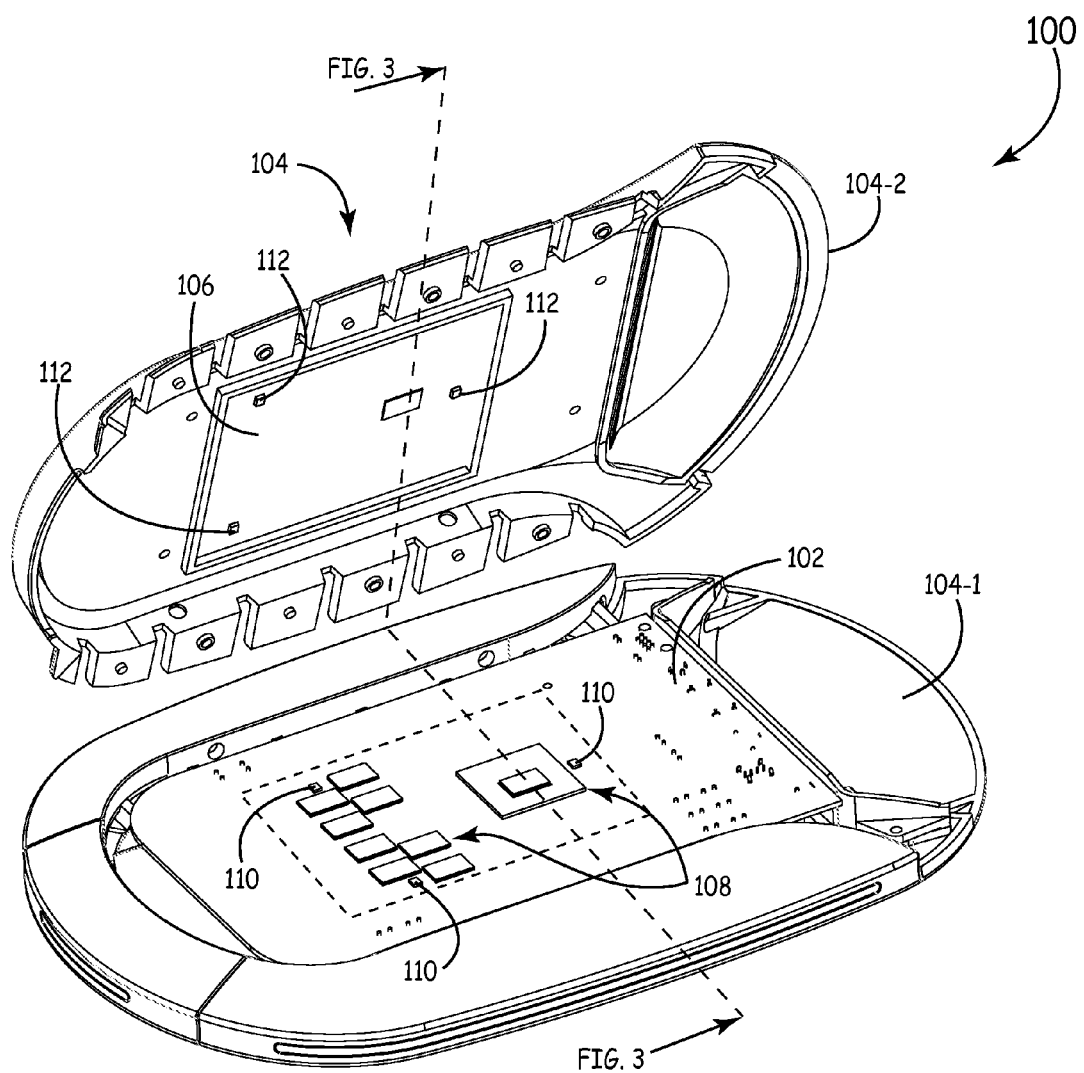
FIG. 1A is a perspective view of an example of an electronic device including a plurality of electronic components protected from tampering by a tamper sensitive material.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 1B:
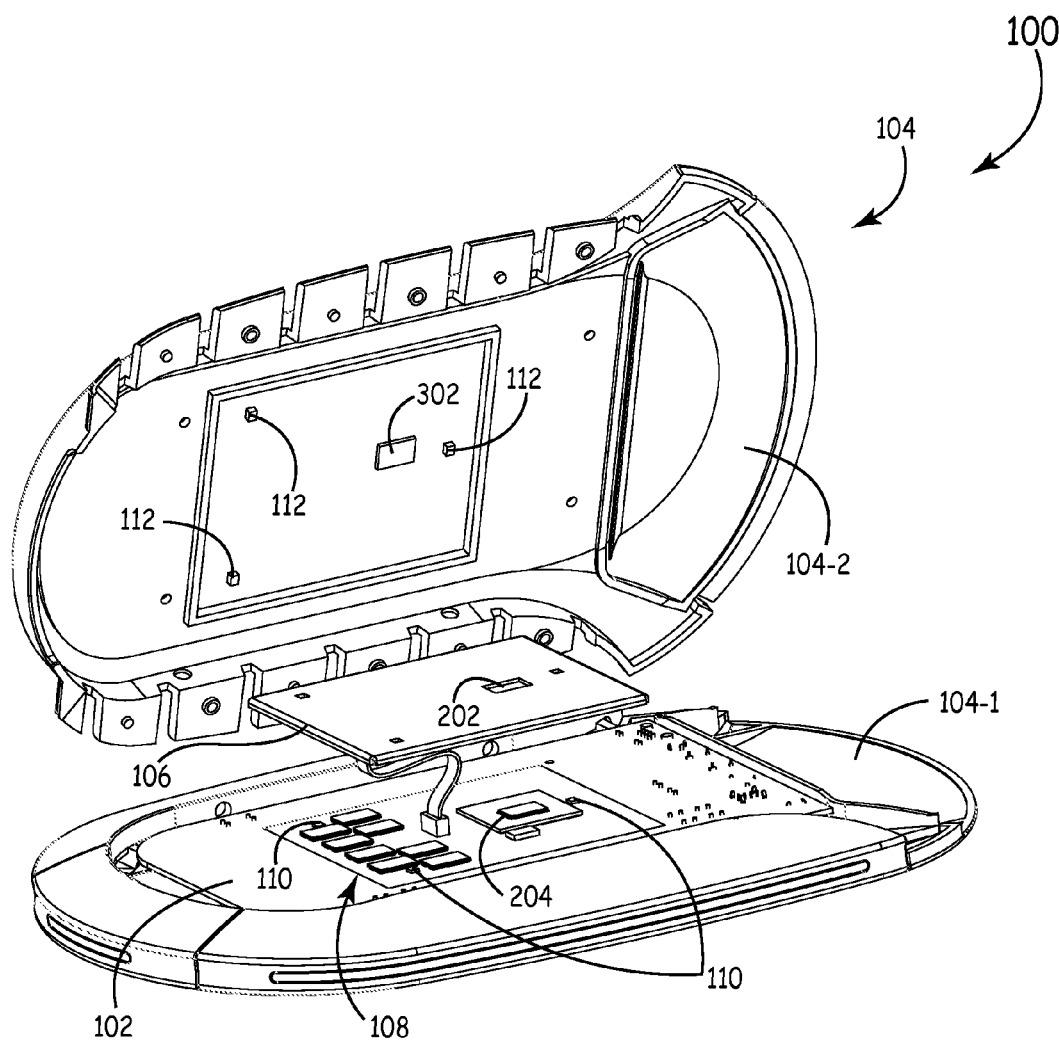
FIG. 1B is a semi-exploded view of the electronic device of FIG. 1A.

FIGS. 1A and 1B illustrate an example of an electronic device 100 including a plurality of electronic components protected from tampering by a tamper sensitive material. In an example, the tamper sensitive material can be integrated into a larger housing 104 for the electronic device 100. The electronic device 100 can include a printed circuit board (PCB) 102 that is mounted to the housing 104 (e.g., a shell). The PCB 102 can include a plurality of electronic components mounted thereon and configured to implement the electronic functions of the electronic device 100. The electronic device 100 can also include a tamper sensitive material 106 (e.g., a security shield, anti-tamper material) disposed to protect one or more of the electronic components on the PCB 102. In an example, the tamper sensitive material 106 can be integrated into the housing 104.

FIG. 1A is a view of the electronic device 100 showing the housing 104 in an open position. In an example, the housing 104 comprises multiple parts that are configured to be connected together and can substantially surround the PCB 102. As shown in FIG. 1A, a first part 104-1 of the housing 104 can be configured to cover a first side (e.g., a bottom) of the PCB 102 and a second part 104-2 of the housing 104 can be configured to cover a second side (e.g., a top) of the PCB 102. The first part 104-1 can be configured to connect with the second part 104-2 to substantially surround the PCB 102. To secure the PCB 102 in place, the PCB 102 can be mounted to the housing 104, for example, by mounting the PCB 102 to the first part 104-1. The housing 104 can be composed of any suitable material including plastic, metal, or other materials.

In an example, the tamper sensitive material 106 can be integrated into the housing 104, for example, into the second part 104-2 of the housing 104. For example, the tamper sensitive material 106 can be integrated into the housing 104 by bonding one or more layers of the tamper sensitive material 106 to a surface of the housing 104. The tamper sensitive material 106 can be disposed about the housing 104 such that when the housing 104 is secured around the PCB 102, the tamper sensitive material 106 covers one or more of the electronic components on the PCB 102. Accordingly, the tamper sensitive material 106 can be disposed to protect one or more electronic components by sensing attempted access of (e.g., tampering with) the one or more electronic components. The one or more electronic components on the PCB 102 that are protected by the tamper sensitive material 106 are referred to herein as the highly protected components 108. In an example, the highly protected components 108 can include one or more processing devices coupled to one or more memory devices. The one or more memory devices can have data stored therein to which access can be restricted by the physical security of the electronic device 100. The one or more memory devices can include any type of data including encryption keys, confidential information, software, or other data.

If tampering is sensed by the tamper sensitive material 106, the data within the one or more memory devices can be zeroized. In one example, the one or more memory devices holding the data can comprise volatile memory, and zeroizing the data can include removing power from the one or more memory devices, thereby removing the data from the memory. Accordingly, the highly protected components 108 can include security electronics that are coupled to the tamper sensitive material 106 and are configured to zeroize the data in the one or more memory devices based on a state of the tamper sensitive material 106. In an example, the tamper sensitive material 106 is a passive sensor having a plurality of states, wherein each state provides a different reading for the sensor. Accordingly, the security electronics can obtain a reading to determine the state for the tamper sensitive material 106. The tamper sensitive material 106 can be a capacitive sensor (e.g., a touch sensitive material), an impedance sensor (e.g., formed of Kapton®), an inductive sensor, or other sensing material. In some examples, multiple layers of the tamper sensitive material 106 can be used. In some examples, the tamper sensitive material 106 can include a flexible touch sensitive circuit. Accordingly, some examples of the tamper sensitive material 106 can detect simple touching of the tamper sensitive material 106. These touch sensitive tamper materials can be used to provide aggressive security for the highly protected components 108.

In operation, the security electronics can obtain a first reading from the tamper sensitive material 106 prior to an attempted tampering. Then, the security electronics can operate in secure mode by continually obtaining readings from the tamper sensitive material 106. If the reading from the tamper sensitive material 106 changes in a manner that indicates an attempted tampering, the security electronics can zeroize the data in the one or more memory devices coupled thereto.

FIG. 1B is a semi-exploded view of the electronic device 100 showing the housing in an open position and the tamper sensitive material 106 in an intermediate position to illustrate its position with respect to the circuit board 102. As mentioned above, the tamper sensitive material 106 can be disposed to protect the highly protected components 108. In an example, in order to protect the highly protected components 108 the tamper sensitive material 106 can be disposed to cover the highly protected components 108 and generally form an enclosure for the highly protected components 108 using the surface of the PCB 102. That is, the highly protected components 108 can be mounted on a surface of the PCB 102. The tamper sensitive material 108 can be disposed opposite the first surface of the PCB 102, over the highly protected components 108, and extend such that the tamper sensitive material 108 is adjacent to and detached from the first surface around a perimeter of the highly protected components 108. Additionally, the PCB 102 can be constructed such that the attempted access to the highly protected components 108 through a second side (the reverse side from the first surface) of the PCB 102 can cause the data in the one or more memory devices to be zeroized and/or can render the highly protected components 108 inoperable. In an example, the PCB 102 has a layer of tamper sensitive material disposed therein which is coupled to the security electronics. Thus, attempted access through the tamper sensitive material in the PCB 102 can also cause the data in the one or more memory devices to be zeroized. In another example, the tamper sensitive material 108 can be disposed around both sides of the PCB 102 such that attempted access from both the first and second side of the PCB 102 can be detected by the tamper sensitive material 108.

Accordingly, physical access to the highly protected components 108 can be restricted from all directions. For example, attempted access through the second side of the PCB 102 can cause the data to be zeroized and/or can render the highly protected components 108 inoperable. Attempted access through the tamper sensitive material 108 can cause the security electronics to zeroize the data. Accordingly, the data in the one or more memory devices can be protected from unauthorized physical access.

In an example, one or more sensors 110 can be mounted on the PCB 102 and can be configured to sense if the tamper sensitive material 106 is separated from the PCB 102. In an example, the one or more sensors 110 can include a pressure sensor (e.g., a pressure sensitive switch, microswitch), wherein one or more features 112 physically associated with the tamper sensitive material 106 can be configured to contact and engage the pressure sensor when the tamper sensitive material 106 is closed over (e.g., protecting) the PCB 102. If the tamper sensitive material 106 is separated from the PCB 102, the pressure sensor will disengage. The disengaging of the pressure sensor can then be used to indicate that the tamper sensitive material 106 has separated from the PCB 102 and appropriate action can be taken. In another example, the one or more sensors 110 can include a light sensor (e.g., a photocell). When the tamper sensitive material 106 is closed the light sensor detects little light. If the tamper sensitive material 106 is separated from the PCB 102, however, the light sensor can detect ambient light in the vicinity of the electronic device 100. Thus, the light sensor can be used to indicate if the tamper sensitive material 106 is separated from the PCB 102. In an example, both a light sensor and a pressure sensor can be used.

In an example, the one or more sensors 110 can be included in the highly protected components 108. Accordingly, the one or more sensors 110 can be highly protected from tampering. The one or more sensors 110 can be coupled to the security electronics to enable the security electronics to zeroize the data in the one or more memory devices if the one or more sensors 110 detect that the tamper sensitive material 106 has been separated from the PCB 102. Thus, the one or more sensors 110 can provide additional protection for the highly protected components 108.

As shown in FIG. 1A, the tamper sensitive material 106 can be integrated into the housing 104. In particular, the tamper sensitive material 106 can be integrated into the second part 104-2 of the housing 104. With the tamper sensitive material 106 integrated into the second part 104-2 of the housing 104, the tamper sensitive material 106 will physically move with the second part 104-2 of the housing 104. Accordingly, the one or more features 112 for engaging the pressure sensor of the one or more sensors 110 can be formed in the second part 104-2 of the housing 104. Thus, the data in the one or more memory devices can be zeroized, if the second part 104-2 of the housing 104 is separated from the PCB 102. In an example, the one or more features 112 can extend through the tamper sensitive material 106 in order to contact the one or more sensors 110. To enable the one or more features 112 to extend through the tamper sensitive material 106, the tamper sensitive material 106 can include one or more apertures corresponding to the one or more features 112. The one or more features 112 can extend through the one or more apertures in the tamper sensitive material 106. In an example, the apertures in the tamper sensitive material 106 can have a size (e.g., a diameter) that is similar to or smaller than a size of a contact area for the one or more sensors 110. Keeping the size of the apertures of the tamper sensitive material 106 small can help to reduce the likelihood that the interior of the enclosure formed by the tamper sensitive material 106 can be accessed through the apertures.

In addition to providing protection for the highly protected components 108, the electronic device 100 can also provide tamper protection for electronic components outside the area protected by the tamper sensitive material 106. This extended tamper protection can be provided by the security electronics detecting if the tamper sensitive material 106 has been separated from the PCB 102. In particular, since the security electronics can detect when the second part 104-2 of the housing 104 and the integrated tamper sensitive material 106 are separated from the PCB 102, the entire second part 104-2 can act as an extended tamper security shield. For example, the second part 104-2 can be formed to cover a larger area than the tamper sensitive material 106 such that the second part 104-2 extends to cover electronic components on the PCB 102 other than the highly protected components 108. In an example, this larger area is at least twice as large as the area on the PCB 102 covered by the tamper sensitive material 106. These other electronic components within the larger area and outside of the area covered by the tamper sensitive material 106 can be protected by having the security electronics take appropriate action if the second part 104-2 is separated from the PCB 102. For example, the security electronics can zeroize the data in the one or more memory devices and/or can zeroize other data within the other components. In an example, the second part 104-2 of the housing 104 can extend to cover the entire first surface of the PCB 102. In this way, tamper protection can be extended to the other components even through these other components are not covered by the tamper sensitive material 106. Moreover, upon merely opening the housing 104 (e.g., separating the second part 104-2 from the PCB 102), the data in the one or more memory devices can be zeroized, thus providing increased protection for the highly protected components 108.

In some examples, one or more of the highly protected components 108 can produce a significant amount of heat. Dissipating the heat from these components can be challenging due to the tamper sensitive material enclosing the components. Accordingly, in some examples, the tamper sensitive material 106 can be configured such that heat can be dissipated from one or more of the highly protected components 108. For example, the tamper sensitive material 106 can define an aperture 202 above one of the highly protected components 108. A heat sink 302 can be thermally coupled to the highly protected component 108 through the aperture. The heat sink 302 can extend outward from the aperture above the tamper sensitive material 106 to dissipate heat from the highly protected component 108.

Figure 2:
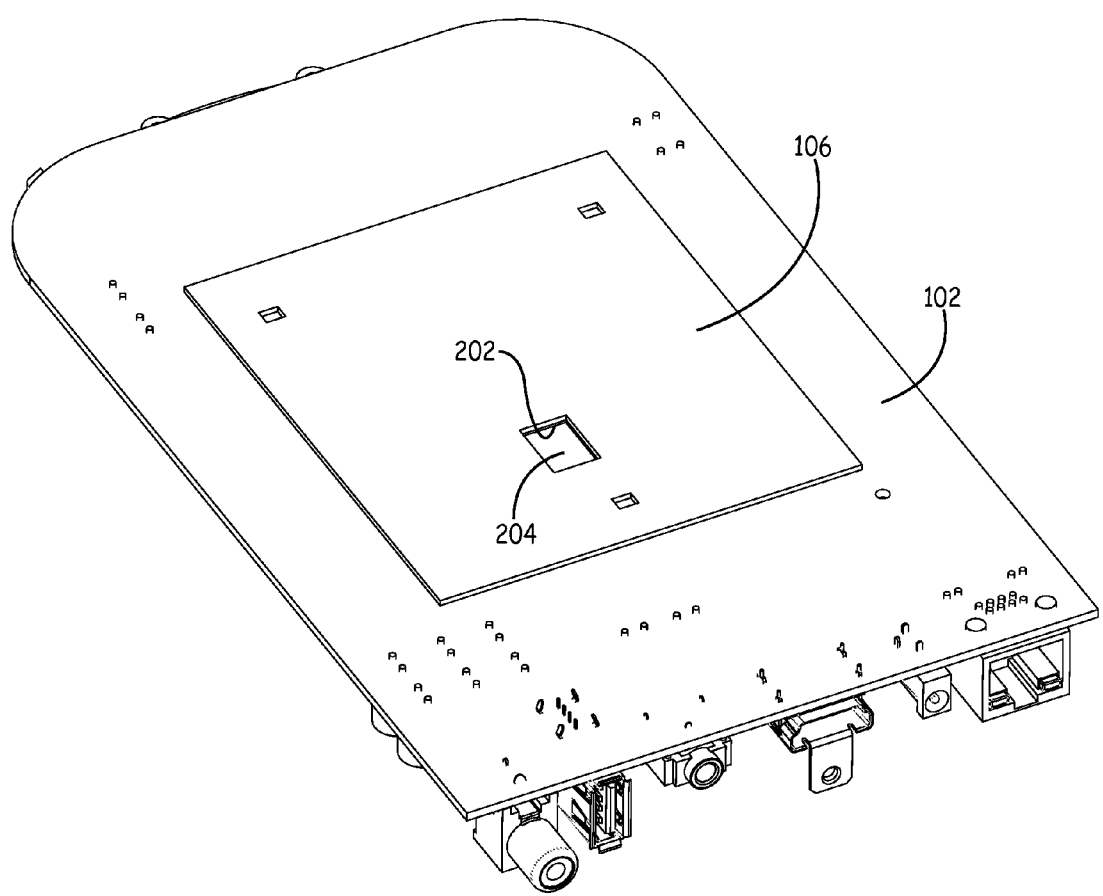
FIG. 2 is a perspective view of an example printed circuit board and the tamper sensitive material from the electronic device of FIG. 1A.

FIG. 2 is a top view of the PCB 102 and the tamper sensitive material 106. As shown, the aperture 202 corresponds to a first component 204 of the highly protected components 108. In an example, the first component 204 is a chip that generates a significant amount of heat (e.g., a processing unit). The aperture 202 can have a size that is approximately the size of an adjacent surface of the chip. In particular, the aperture 202 can be sized large enough such that sufficient contact can be made with the surface of the chip 204 to enable thermal conduction. The aperture 202, however, can be sized small enough such that access to the interior of the enclosure formed by the tamper sensitive material 106 is difficult or impossible through the aperture 202. Along with having a size the corresponds with the size of the aperture 202, the tamper sensitive material 106 can be disposed such that the aperture 202 is close to the surface of the first component 204. This can further limit the ability to access the interior of the enclosure formed by the tamper sensitive material 106. In an example, the aperture 202 can be within a range of 0 to 5 millimeters from the surface of the first component 204. The tamper sensitive material 106 can also include one or more apertures 206 that enable features 112 to extend through and contact sensors 110. In an example, the one or more apertures 206 are sized corresponding to the one or more features 112.

Figure 3:
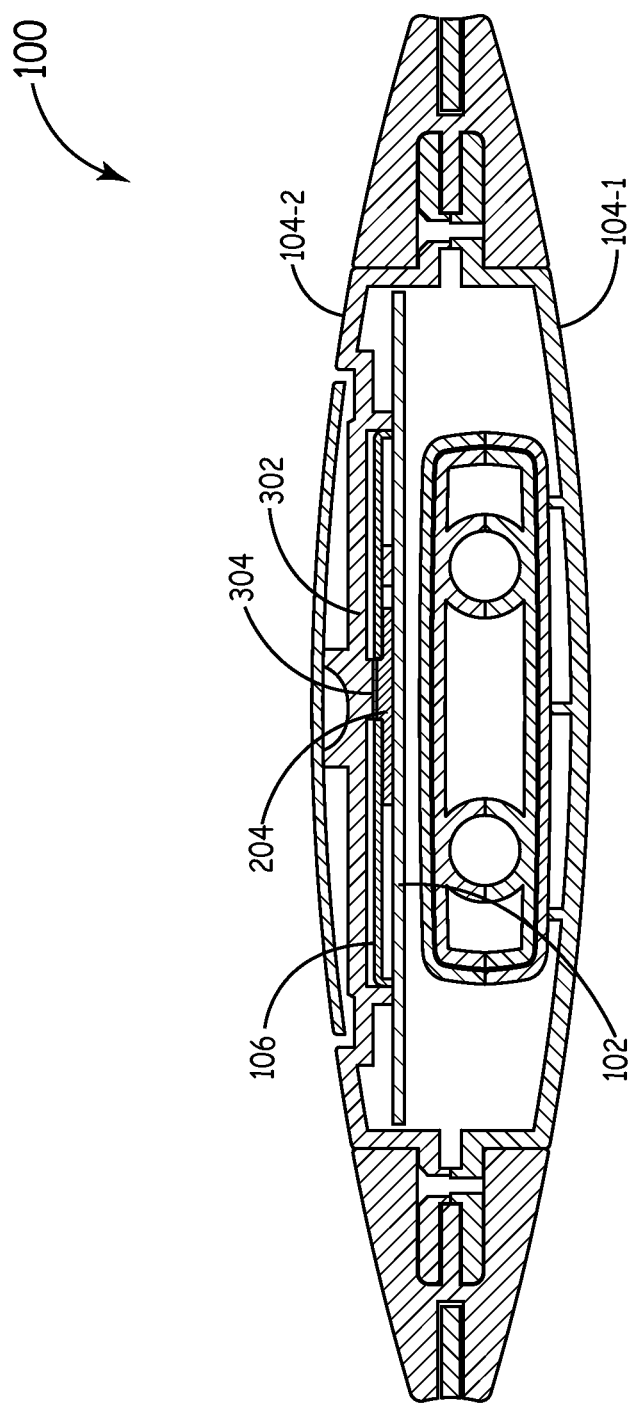
FIG. 3 is a cross-sectional view of the electronic device of FIG. 1A.

FIG. 3 is a cross-sectional view of the electronic device 100. As shown, the heat sink 302 can extend through the aperture 202 to thermally couple with the first component 204. Heat flowing into the heat sink 302 from the first component 204 can be dissipated outside of the enclosure via fins of the heat sink 302. In an example, a thermal interface material 304 can be disposed between the heat sink 302 and the first component 204 to aid in heat transfer. The heat sink 302 can be formed of any suitable material including copper, aluminum, graphene, or other material.

Figure 4:
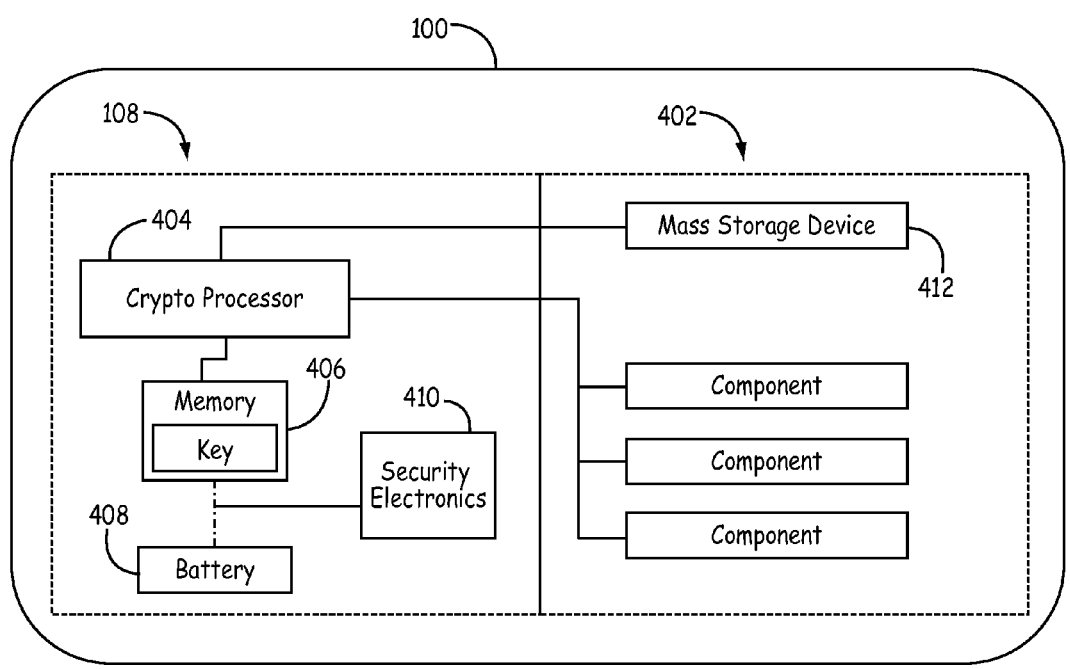
FIG. 4 is a block diagram of example components for the electronic device of FIG. 1A.

FIG. 4 is a block diagram of example electronic components for the electronic device 100. As mentioned above, the electronic device 100 can include highly protected components 108 that are protected by the tamper sensitive material 106 and less protected components 402 that are protected by the housing 104, but not by the tamper sensitive material 106. In an example, the highly protected components 108 can include a cryptographic processor 404 coupled to one or more memory devices 406. As mentioned above, the one or more memory devices 406 can have data such as a cryptographic key stored therein. The cryptographic key can be provided to the cryptographic processor 404 and used to encrypt and decrypt data. In an example, the one or more memory devices 406 can include static random access memory (SRAM). The highly protected components 108 can also include a battery 408 coupled to the SRAM. The battery 408 can maintain the data within the SRAM when external power (e.g., line power) is not applied to the electronic device 100 and/or when the electronic device 100 is powered off. Accordingly, the data (e.g., the cryptographic key) within the SRAM can be maintained without needing to be repeatedly externally loaded into the electronic device 100. Moreover, holding the data in SRAM can enable the data to be effectively zeroized. That is, the data in the SRAM can be zeroized by removing power to the SRAM. Accordingly, upon detection of tampering with the electronic device 100, power can be removed from the SRAM thus zeroizing the data in the SRAM. Moreover, freezing of the electronic device 100 in an attempt to access the data will also result in power loss to the SRAM, thereby zeroizing the data therein. In some examples, the SRAM can include temperature sensors that automatically zeroize the data upon detecting a temperature reading out of band.

The highly protected components 108 can also include security electronics 410 coupled to control connection of the battery 408 to the one or more memory devices 406. The security electronics 410 can be configured to cut off power to the one or more memory devices 406 upon detection of tampering with the electronic device 100. The security electronics 410 can be coupled to the tamper sensitive material 106 in order to detect tampering. In an example, a Wheatstone bridge can be coupled to the tamper sensitive material 106 to sense a change in state in the tamper sensitive material 106. The security electronics 410 can also be coupled to the one or more sensors 110 in order to zeroize the data in the one or more memory devices 406 if the one or more sensors 110 detect separation of the tamper sensitive material 106 from the PCB 102. Accordingly, the highly protected components 108 can be configured to implement secret cryptographic functions which are protected from physical access. Thus, the electronic device 100 can be provided to a potentially unfriendly individual and still provide secure cryptographic functions.

In an example, the electronic device 410 can be configured to be coupled to a mass storage device 412. The mass storage device 412 can hold encrypted data. The electronic device 410 can be configured to send data between the cryptographic processor 404 and the mass storage device 412. Data from the mass storage device 412 can be decrypted by the cryptographic processor 404 and can be provided to the less protected components 402. Additionally data to be stored on the mass storage device 412 can be provided by the less protected components 402, encrypted by the cryptographic processor 404, and stored on the mass storage device 412. Accordingly, the data stored on the mass storage device 412 can be protected from unauthorized access.

In an example, the less protected electronics 402 can include electronic components to perform other less secretive functions of the electronic device. For example, the less protected electronics 402 can include a general purpose processor (e.g., a CPU, microprocessor) coupled to a memory device having instructions thereon for implementing the functions of the electronic device.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An electronic device comprising:
   a circuit board having one or more electronics mounted thereon;
   a housing surrounding the circuit board, the housing comprising at least a first part attached to a second part, wherein the circuit board is mounted to the second part;
   a security shield integrated into the first part of the housing and covering the one or more electronics on the circuit board, wherein the one or more electronics are coupled to the security shield, wherein the one or more electronics sense tampering by detecting a change in the security shield, wherein the one or more electronics zeroize data stored in a memory device covered by the security shield in response to such tampering, wherein the one or more electronics include a chip, and the security shield defines an aperture; and
   a heat sink extending through the aperture and thermally conductively coupling with the chip, the heat sink extending outside of the security shield.

2. The electronic device of claim 1, wherein the aperture is approximately the same size as an adjacent surface of the chip.

3. The electronic device of claim 1, wherein the aperture is within the range of 0 to 5 millimeters from the adjacent surface of the chip.

4. The electronic device of claim 1, wherein the heat sink includes a plurality of fins extending outside the security shield.

5. The electronic device of claim 1, comprising:
   a thermal interface material between the heat sink and the chip.

6. The electronic device of claim 1, wherein the chip comprises a processor.

7. The electronic device of claim 1, wherein the security shield comprises one of a capacitive sensor or a pressure sensor and wherein the one or more electronics covered by the security shield are configured to sense a state of the security shield and zeroize data based on the state.

8. The electronic device of claim 1, wherein the security shield comprises one or more layers of an anti-tamper material that is disposed on the heat sink.

9. A method of manufacturing an electronic device, the method comprising:
   forming a first and second part of a housing;
   forming a heat sink including a projection;
   attaching an anti-tamper material to the heat sink such that the anti-tamper material surrounds the projection and the projection extends through the anti-tamper material, wherein the anti-tamper material senses tampering;
   attaching the heat sink and the anti-tamper material to the first part of the housing;
   attaching a circuit board to the second part of the housing;
   thermally conductively coupling the projection of the heat sink to a chip on the circuit board, wherein data on the circuit board is zeroized in response to tampering; and connecting the first and second part of the housing to cover the circuit board.

10. The method of claim 9, comprising:
    integrating the heat sink into the housing for the circuit board; and
    wherein thermally coupling the projection of the heat sink to the chip includes attaching the housing to the circuit board.

11. The method of claim 9, comprising:
    coupling the anti-tamper material to tamper responsive electronics on the circuit board such that the tamper responsive electronics zeroize data on the circuit board based on a state of the anti-tamper material.

12. The method of claim 9, comprising:
    placing a thermal interface material between the projection of the heat sink and the chip.

13. An electronic device comprising:
    a circuit board having a chip and other electronics mounted thereon;
    a housing surrounding the circuit board, the housing comprising at least a first part attached to a second part, wherein the circuit board is mounted to the second part;
    a heat sink integrated into the first part of the housing and thermally coupled to the chip, the heat sink have an inner surface opposite the chip; and
    an anti-tamper material attached to the inner surface of the heat sink, the anti-tamper material disposed to provide tamper protection for the chip, wherein the anti-tamper material senses tampering, wherein data on the circuit board is zeroized in response to tampering, wherein the heat sink extends through the anti-tamper material to thermally couple with the chip.

14. The electronic device of claim 13, wherein the heat sink extends through an aperture in the anti-tamper material that is approximately the same size as an adjacent surface of the chip.

15. The electronic device of claim 14, wherein the aperture is within the range of 0 to 5 millimeters from the adjacent surface of the chip.

16. The electronic device of claim 13, wherein the heat sink includes a plurality of fins extending outside the anti-tamper material.

17. The electronic device of claim 13, comprising:
    a thermal interface material between the heat sink and the chip.

18. The electronic device of claim 13, wherein the chip comprises a processor.

19. The electronic device of claim 13, wherein the anti-tamper material comprises one of a capacitive sensor or a pressure sensor and wherein the circuit board includes electronics covered by the anti-tamper material that are configured to sense a state of the anti-tamper material and zeroize data based on the state.

20. The electronic device of claim 13, wherein the anti-tamper material comprises one or more layers of material adhered to the heat sink.

* * * * *